United States Patent [19]
Heil

[11] Patent Number: 5,450,411
[45] Date of Patent: Sep. 12, 1995

[54] NETWORK INTERFACE FOR MULTIPLEXING AND DEMULTIPLEXING ISOCHRONOUS AND BURSTY DATA STREAMS IN ATM NETWORKS

[75] Inventor: Thomas F. Heil, Easley, S.C.

[73] Assignee: AT&T Global Information Solutions Company, Dayton, Ohio

[21] Appl. No.: 299,983

[22] Filed: Sep. 2, 1994

[51] Int. Cl.$^6$ .............................................. H04L 12/50
[52] U.S. Cl. ..................................... 370/94.2; 370/41; 370/60.1
[58] Field of Search ....................... 370/41, 42, 43, 60, 370/60.1, 94.1, 94.2

[56] References Cited

U.S. PATENT DOCUMENTS

| | | | |
|---|---|---|---|
| 4,035,580 | 7/1977 | Dieter et al. | 370/41 |
| 5,056,088 | 10/1991 | Price et al. | 370/94.1 |
| 5,117,429 | 5/1992 | Lagoutte | 370/60 |
| 5,173,901 | 12/1992 | DeSomer | 370/112 |
| 5,200,950 | 4/1993 | Foglar et al. | 370/16 |
| 5,208,807 | 5/1993 | Gass et al. | 370/60.1 |
| 5,214,643 | 5/1993 | Mueller et al. | 370/99 |
| 5,237,569 | 8/1993 | Sekihata | 370/94.1 |
| 5,239,544 | 8/1993 | Balzano et al. | 370/60.1 |
| 5,245,605 | 9/1993 | Ofek | 370/85.12 |
| 5,260,783 | 11/1993 | Dixit | 358/136 |
| 5,301,189 | 4/1994 | Schmidt et al. | 370/60.1 |
| 5,343,462 | 8/1994 | Sekihata et al. | 370/60.1 |

OTHER PUBLICATIONS

"Introduction to Sonet ATM" by Rick Curtis, TI Technical Journal, Jan.–Feb. 1994, pp. 84–90.

"An ATM Primer" by Pantelis Athanasiou, Smart Net Spring/Summer 1993, pp. 14–18.

"Special Report: Communications Introduction" IEEE Spectrum Jun. 1994, pp. 19–45.

Primary Examiner—Benedict V. Safourek

[57] ABSTRACT

An asynchronous transfer mode network interface is provided to multiplex isochronous and bursty data traffic over a single logical connection. Isochronous data is received by the network interface and stored in a buffer for subsequent multiplexing with bursty data received and stored in a buffer and for transmission over the single logical connection.

11 Claims, 7 Drawing Sheets

FIG. 1

PRIOR ART

NETWORK INTERFACE FOR MULTIPLEXING AND DEMULTIPLEXING ISOCHRONOUS AND BURSTY DATA STREAMS IN ATM NETWORKS

BACKGROUND

1. Technical Field

The invention relates to network interfaces for asynchronous transfer mode networks which multiplex and demultiplex isochronous and non-isochronous data streams on a single physical channel, independent of host processors.

2. Description Of Related Art

Isochronous and non-isochronous information have different characteristics which impose different demands on communication networks. As a result, different transfer modes were developed to transport information from one point to another along particular communication networks.

For the present application non-isochronous data will also be referred to as bursty data. Such bursty type data includes for example, file transactions and e-mail transactions. Isochronous data, on the other hand, is often transferred between end points using a circuit switching transfer mode which establishes and maintains a continuous circuit between the end points for the duration of the communications.

Typically, bursty data has a high peak-to-average rate ratio, mandates error-free transmission, and has relatively course end-to-end timing constraints. For example, a remote database access may specify that a query message be delivered from client to a server in under 5 seconds 95 percent of the time. However, if a transmission error is detected, the correct response is to retransmit the query message even if the 5 second specification is violated. Traditional local area networks (LANs), such as Ethernet and Token Ring networks, are designed to transfer bursty data.

In contrast, isochronous data is regular in time, i.e., has a fixed bandwidth, and usually does not require error-free transmission since errors typically result as audio/video noise. In addition, isochronous data has stringent end-to-end timing constraints. Traditional wide area networks (WANs) like the telephone network and integrated services digital networks (ISDN's) are geared for isochronous data. These networks can support composite streams with both isochronous and bursty data traffic, however they are heavily biased toward isochronous traffic. For example, an ISDN 128 kbps Basic Rate Interface (BRI) is a reasonable medium for the voice and video components of an integrated voice/video/data call, but the data rate of the data component is likely 64 kbps or less, which is substantially slower than the 10 Mbps data rates realized on traditional local area networks.

Traditional local area networks and wide area networks are not well suited to transfer composite data streams of isochronous and non-isochronous information. In general, local area network technology (both hardware and software) is intrinsically biased for bursty data. Multiplexing multiple logical connections (with potentially different data types) onto the network is an upper-layer software construct, adapted for time-insensitive, error-free data connections. However, isochronous, e.g., voice and/or video, information transmission requires a guaranteed bandwidth and tightly bounded delivery delays. Low-end isochronous streams may be viable over traditional LANs, however the resolution and quality achieved is often unacceptable for practical uses. Moreover, as the demands imposed on communication networks increase, the transfer of isochronous data along traditional local area networks is impracticable. For example, isochronous information streams require real-time processing which cannot be provided by current local area networks and host processors, except when transporting information streams with low bandwidths.

Wide area network technology has evolved to provide isochronous and bursty data stream transmission capabilities. Such wide area networks designs are primarily directed to transfer isochronous data independent of host processors and secondarily to transfer bursty data at rates of approximately 64 kbps. However, such bursty data rates are unacceptable for multimedia communications, which require bursty data to be transmitted at a rate of at least 10 Mbps. An example of the above described wide area network is the NCR 3336 Telemedia Connection (TMC) which has a network feed (ISDN BRI) connected directly into an isochronous stream processor (e.g., an AVP Video CODEC chipset, manufactured by AT&T). The stream processor multiplexes and demultiplexes the composite audio/video/data stream, diverting the isochronous components to the appropriate real-time processors, and forwarding the bursty data component to appropriate host processors.

An emerging transfer mode technology developed to overcome the drawbacks of conventional LAN and WAN technologies in network communications is the asynchronous transfer mode (ATM) technology in, for example, Broadband Integrated Services Digital Network (B-ISDN) which is designed to transfer voice, video, image and data. Transfer modes, such as message switching, circuit switching and packet switching, used with the above noted network technologies are primarily dedicated for either isochronous or non-isochronous data and are not adaptable for efficient use in emerging voice, video and data communication networks, such as B-ISDN technology. Thus, asynchronous transfer mode technology was developed to provide communication networks with the capability to support the different kinds of data traffic.

Generally, the ATM technology supports four classes of traffic: 1) constant bit rate, connection-oriented, synchronous traffic (e.g., uncompressed voice and video data); 2) variable bit rate, connection-oriented, synchronous traffic (e.g., compressed voice and video data); 3) variable bit rate, connection-oriented, asynchronous traffic (e.g., X.25); or 4) connectionless packet data (e.g., local area network traffic). ATM technology is based on a cell switching technique which packages or organizes information, such as isochronous or non-isochronous data, into fixed length packets called cells. Each ATM cell is 53 bytes long and includes 5 bytes for a header and 48 bytes for a payload. The ATM header includes various fields used to ensure efficient and accurate transfers of data along the network. One such field is the virtual channel identifier (VCI) which is used to identify the virtual channel upon which the cell is to be transferred.

Asynchronous transfer mode technology is a connection-oriented technology wherein host processors desiring to communicate are required to establish and maintain a logical or virtual connection therebetween. ATM technology utilizes a three layer architecture to facilitate isochronous and non-isochronous data communications. The three layers are the Physical layer, the ATM layer and the ATM Adaption layer (AAL). However, current ATM technology requires traditional host processors to establish and maintain communication links and to route the different data streams (e.g., bursty or isochronous) over the proper communication link. As a result, the number of CPU cycles allocated for data applications in the host processor is reduced in order to accommodate the network communication tasks.

Figure 1:
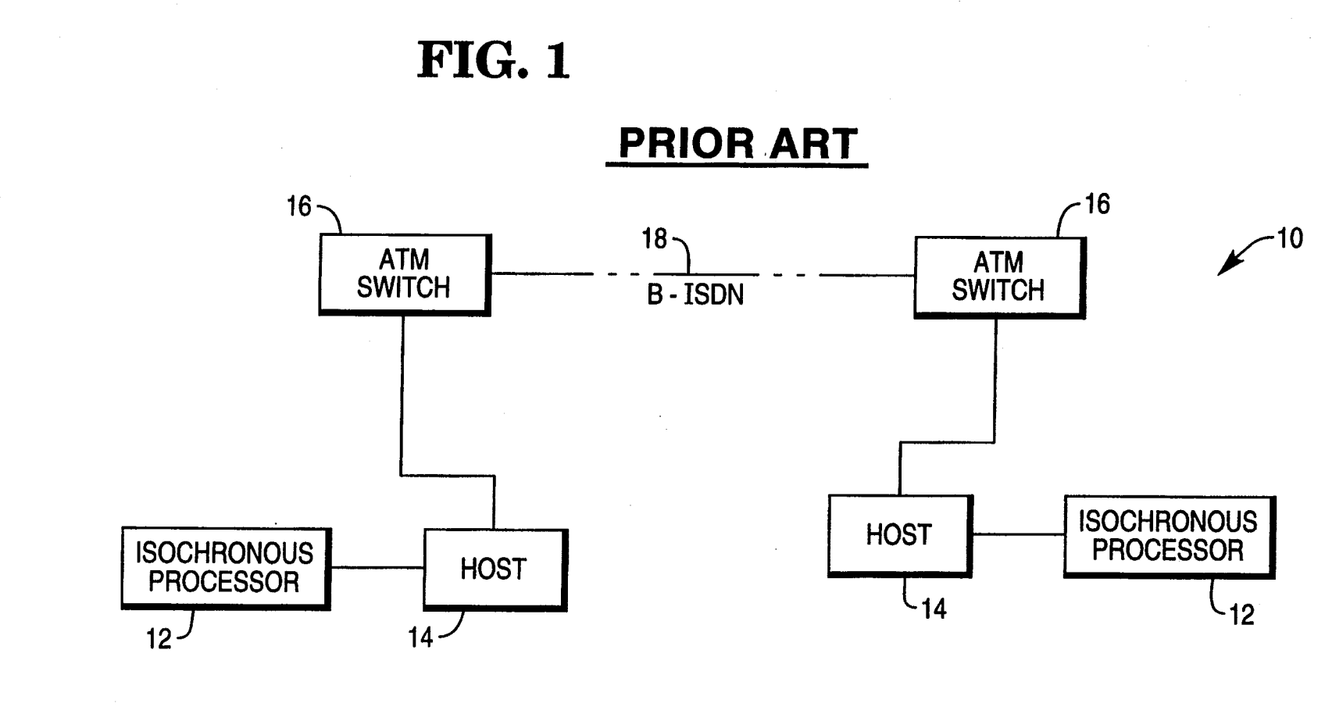
FIG. 1 is a block diagram of prior art ATM network architectures.

Moreover, traditional host processors are not designed to process real-time isochronous data. As a result, the processing of the isochronous data imposes a constant bandwidth restriction on the host processor, which also reduces the number of CPU cycles allocated for data applications. FIG. 1 illustrates a prior art ATM network architecture 10 having isochronous processors 12 connected to host data processors 14 and the host processors connected to known ATM switches 16. A broadband integrated services digital network (B-ISDN) 18 utilizing ATM technology resides between each ATM switch.

Based upon the above-described drawbacks with current ATM technology, a need exists for an ATM network interface which is capable of multiplexing and demultiplexing composite data streams onto a single logical connection independent of a host processor, and which is capable of isolating isochronous data from the host processors so as to reduce the number of CPU cycles dedicated by the host processor to network communications.

SUMMARY

The present invention provides an ATM network interface for multiplexing and demultiplexing isochronous and nonisochronous data streams in asynchronous transfer mode based communications networks. The ATM network interface includes a multiplexer portion and a demultiplexer portion. Preferably, the multiplexer portion includes means for receiving isochronous and nonisochronous data from independent processors, and for generating ATM cells incorporating the data. The multiplexer portion further includes means for multiplexing the ATM cells onto a single logical connection associated with the ATM network. The demultiplexer portion includes means for receiving isochronous and nonisochronous ATM cells from the single logical connection and for demultiplexing the isochronous and nonisochronous ATM cells to extract isochronous data from the isochronous ATM cells and nonisochronous data from the nonisochronous ATM cells. The demultiplexer portion further includes means for storing the extracted isochronous and nonisochronous data for subsequent transfer to independent processors.

In a preferred embodiment the multiplexer portion includes first buffer means for storing isochronous data received from isochronous processors, second buffer means for storing nonisochronous data received from nonisochronous processors, and a multiplexing controller coupled to the first and second buffer means. The multiplexing controller includes means for retrieving the isochronous data from the first buffer means and for creating an ATM cell incorporating the isochronous data. The controller also includes means for retrieving the nonisochronous data from the second buffer means, and for creating an ATM cell incorporating the nonisochronous data. The controller further includes means for multiplexing the isochronous and nonisochronous ATM cells onto the single logical connection of the ATM based communication network.

In a preferred embodiment, the demultiplexing portion includes a demultiplexing controller coupled to the ATM based communication network. The demultiplexing controller provides means for retrieving isochronous and nonisochronous ATM cells from the ATM based communication network and for demultiplexing the ATM cells and extracting the isochronous and nonisochronous data. The demultiplexing controller further includes first buffer means coupled to the demultiplexing controller to store the received isochronous data, and second buffer means coupled to the demultiplexing controller to store the received nonisochronous data.

In an alternative embodiment, the present invention provides an asynchronous transfer mode (ATM) communication network which multiplexes and demultiplexes isochronous and nonisochronous data streams over a single logical connection of the ATM network. Preferably, the network includes at least one network interface coupled to transmitting processors, at least one network interface coupled to receiving processors and an asynchronous transfer mode based broadband integrated services digital network connected between the at least one network interface associated with the transmitting processors and the at least one network interface associated with the receiving processors.

The transmitting processors include isochronous and nonisochronous processors and the network interface associated therewith receives isochronous and nonisochronous data from corresponding transmitting processors, generates individual ATM cells incorporating the isochronous data or the nonisochronous data, and multiplexes the ATM cells onto the ATM based broadband communication network.

The receiving processors include isochronous and nonisochronous processors and the network interface associated therewith, transmits isochronous and nonisochronous data to corresponding receiving processors, demultiplexes ATM cells extracting isochronous data and the nonisochronous data, and stores the extracted data for subsequent transfer to the receiving processors.

BRIEF DESCRIPTION OF THE DRAWINGS

Preferred embodiments of the invention are described hereinbelow with reference to the drawings wherein.

DETAILED DESCRIPTION OF PREFERRED EMBODIMENTS

Figure 2:
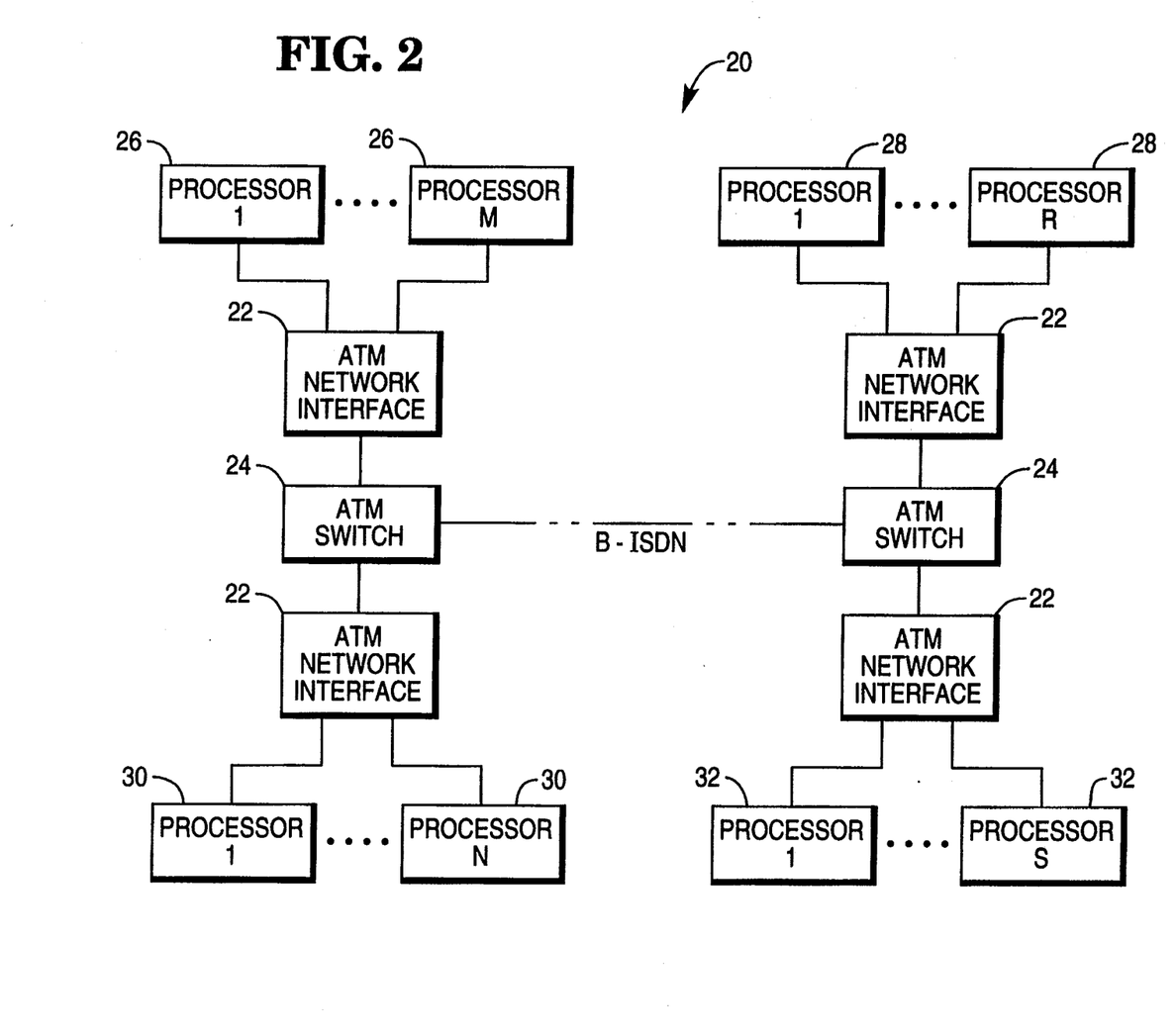
FIG. 2 is a block diagram of an exemplary embodiment of the ATM network architecture according to the present invention.

The present application provides an ATM communication network architecture which includes a network interface to multiplex and demultiplex composite information streams onto a single logical connection independent of the host processors connected to the network. FIG. 2 illustrates an exemplary ATM communication network 20 incorporating network interfaces 22 between ATM switches 24 and a plurality of processors 26, 28, 30 and 32. The ATM switches are known in the art. An example of a suitable ATM switch is the AT&T Univercell. Processors 26, 28, 30 and 32 may be isochronous information processors, such as digital signal processors and video coders/decoders, or non-isochronous information processors, such as the Intel X86 processor line running standard operation systems, such as Microsoft Windows ®.

Figure 3:
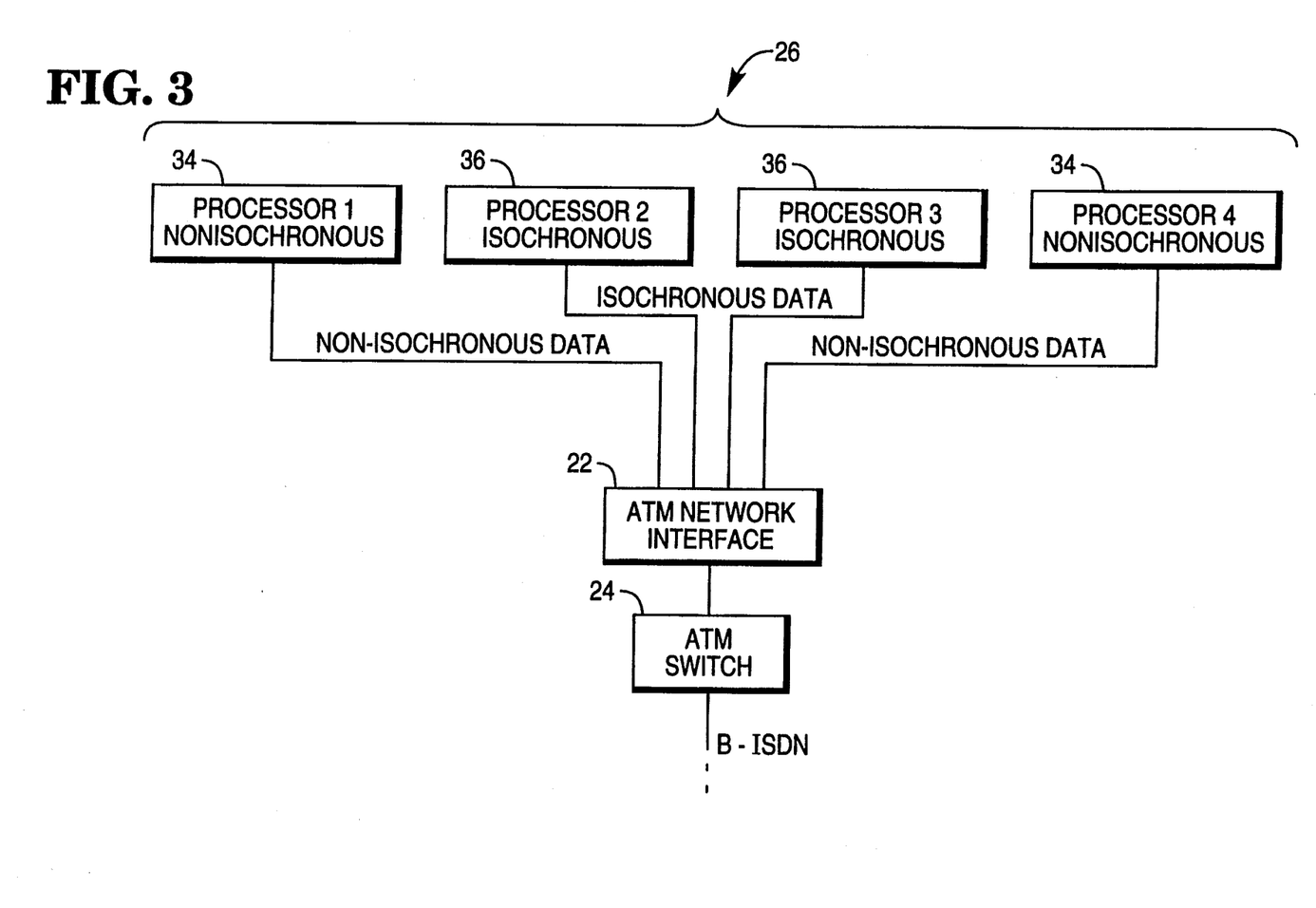
FIG. 3 is an expanded block diagram of a portion of the diagram of FIG. 2, illustrating isochronous and non-isochronous processors connected to an ATM network interface.

FIG. 3 illustrates an expanded view of a single network interface connection to the ATM based communication network shown in FIG. 2. In this configuration, there are four processors connected to the network interface 22. Two of the processors are non-isochronous data processors 34 and two are isochronous processors 36.

As shown in FIG. 1 and described above, current ATM network technology utilizes a host processor to initiate and manage communications between isochronous data processors connected to the network, as well as managing nonisochronous data communications by the host. Utilization of the host processor for such network communication reduces the number of CPU cycles allotted to the host's data application programs. The network interface of the present invention overcomes the drawback of current ATM networks by relieving the host processor of the task of managing isochronous data communications. This is accomplished by connecting the host and isochronous processors to the network interface which then multiplexes and demultiplexes the communications over a single logical connection.

Figure 4:
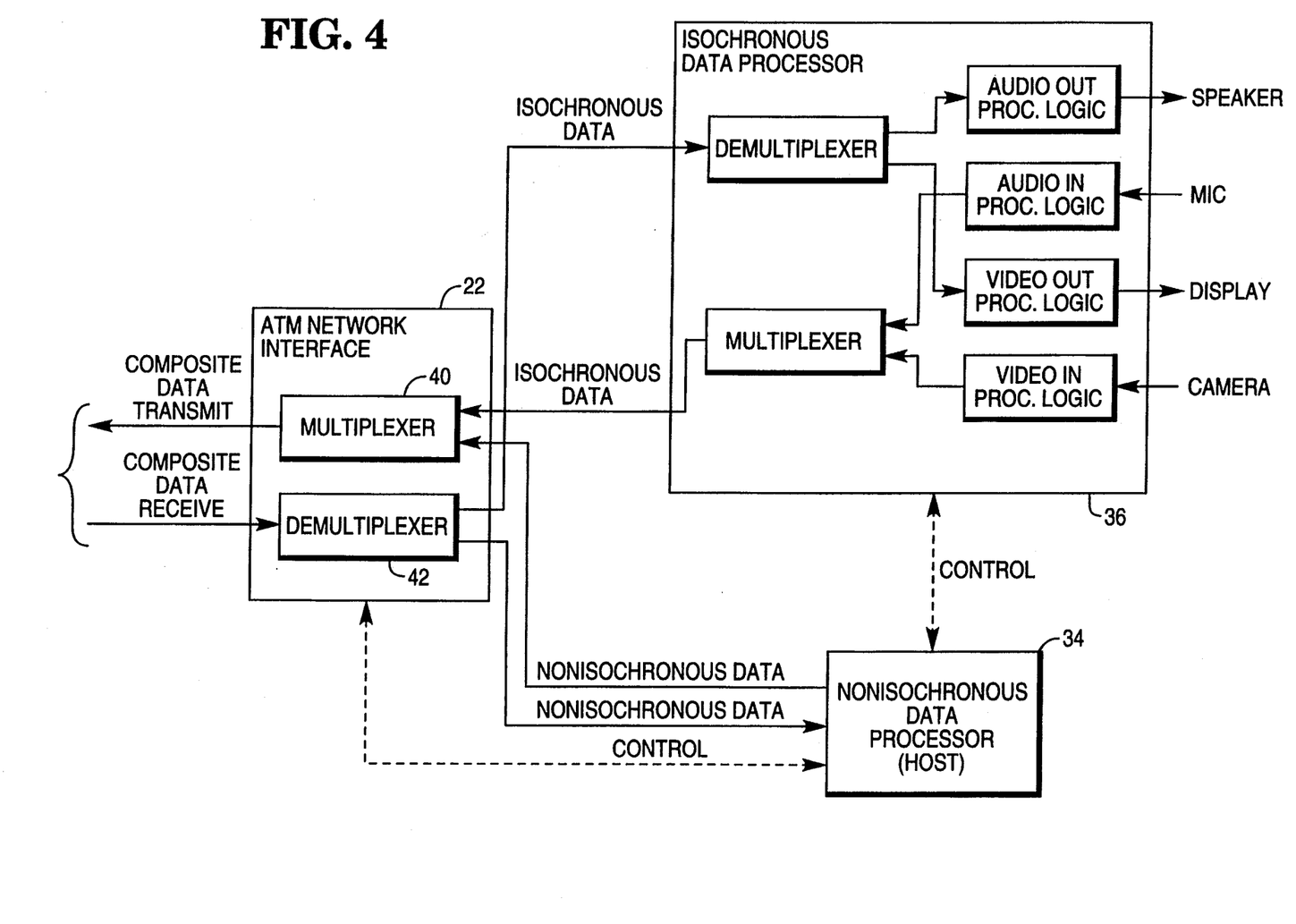
FIG. 4 illustrates functional connections between the ATM network interface and the isochronous and non-isochronous data processors.
Figure 5:
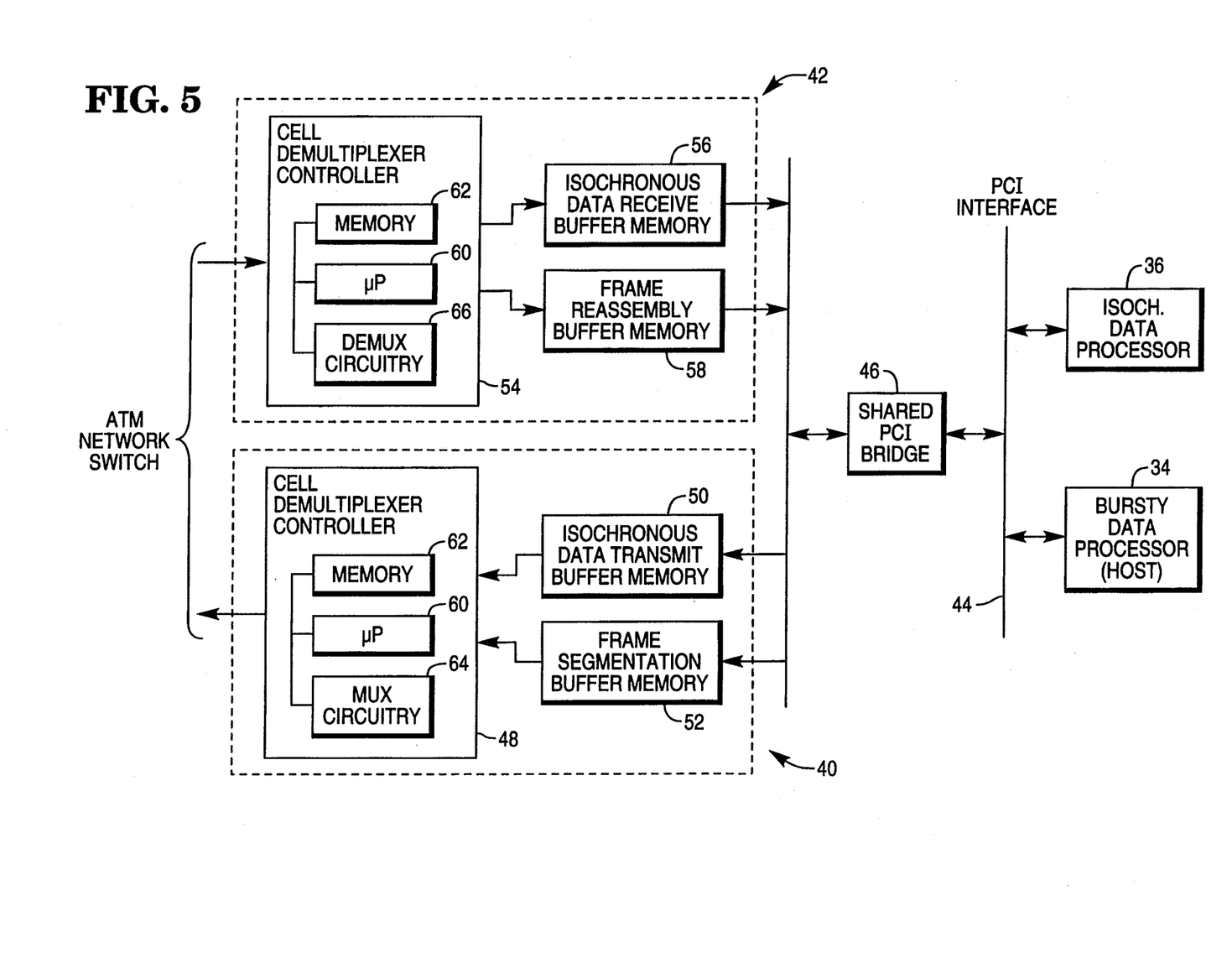
FIG. 5 is a detailed block diagram of the ATM network interface according to the present invention.

Referring to FIGS. 3, 4 and 5, the network interface 22 resides between ATM switch 24 and the various processors 34 and 36. The network interface 22 has a multiplexer portion 40 and a demultiplexer portion 42. The multiplexer portion 40 preferably includes a cell multiplexer controller 48 and buffer memories 50 and 52. Preferably, cell multiplexer controller 48 utilizes a processor 60, such as the Intel model 960 microcontroller or equivalent processor circuitry having similar processing characteristics, and associated memory 62 for storing system and application programs. Multiplexing communication circuitry 64 is coupled to the processor 60 to combine the nonisochronous data with the isochronous data and to transfer the data along a single logical connection via an ATM based communication network, such as an ATM based B-ISDN network. Such multiplexing communication circuitry is known in the art.

Figure 6:
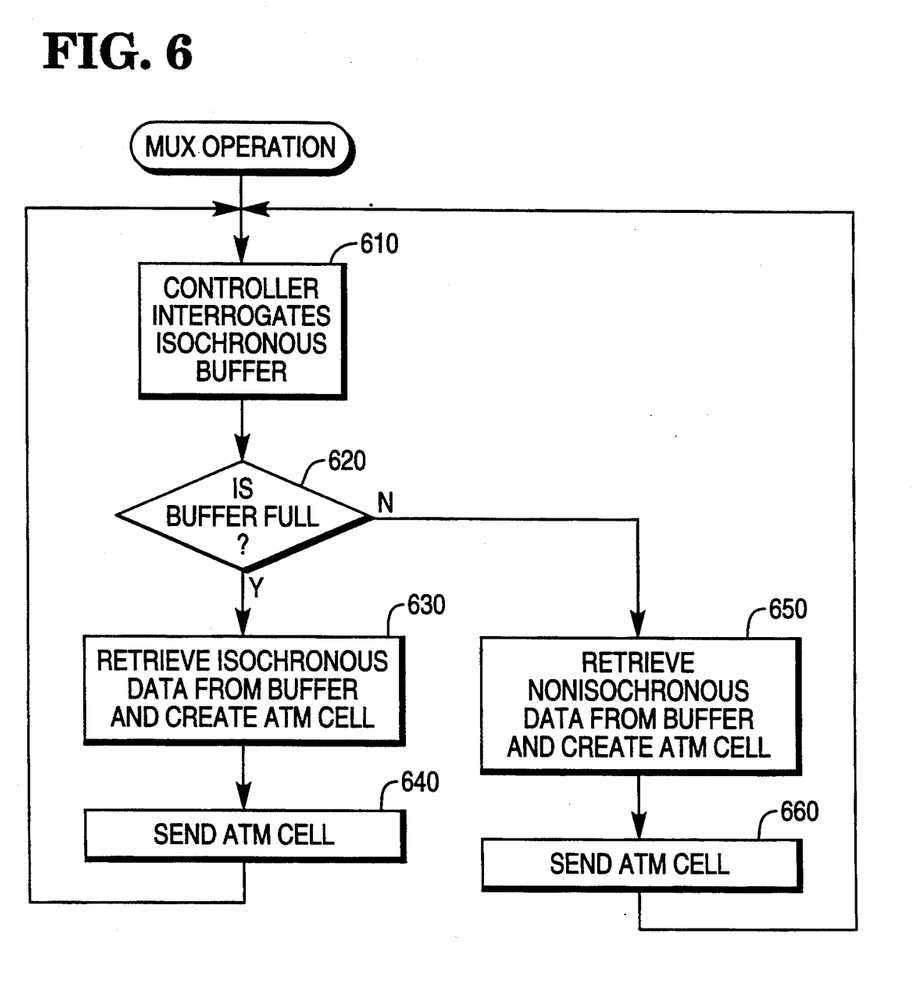
FIG. 6 is a flow diagram of the multiplexing operation according to the present invention.

FIG. 6 illustrates an exemplary flow diagram for the multiplexing operation according to the present invention. Prior to sending data on or receiving data from the ATM network, a host processor at the sending end of the network creates a logical connection with the host processor at the receiving end. Typically, when transferring data along a communication network, the network defines the parameters on how data is transferred, e.g., the bandwidth and bit or baud rates. The ATM based B-ISDN network utilized with the present invention defines the bandwidth for data flow, that is, the network defines how many ATM cells may be transferred per second so that the audio and video portions of the isochronous data stream remain synchronized.

Once the logical connection is established, the host processor is relieved of managing isochronous data flow and the isochronous processors can transmit data therebetween without host processor intervention using the network interface. The network interface 22 receives and stores the isochronous and nonisochronous data for subsequent multiplexing. Numerous methods may be utilized to transfer data from the host or isochronous processors 34 and 36 to the network interface. For example, the network interface 22 may periodically poll each processor for data, or the processors could continue to send data to the network interface 22 until the interface transmits a buffer full interrupt to the processor.

As data is loaded into the buffer memories 50 and 52, the network interface 22 at the transmitting end interrogates the isochronous transmit data buffer 50 to determine if the buffer is either full or has reached a predetermined threshold (steps 610 and 620). If the buffer 50 is full, the multiplexer controller 48 retrieves the isochronous data from the buffer and creates an ATM cell (step 630). Techniques for creating an ATM cell are known in the art. When creating the cell, multiplexer controller 48 incorporates cell header information including the channel identifier. The channel identifier is used by the receiving network interface 22 to transfer the payload of the ATM cell to the appropriate host or isochronous data processor. Once the cell is created the isochronous data can be transferred to the remote processor via the B-ISDN network (step 640). Alternatively, timing or bandwidth constraints may require the isochronous data cell to be temporarily stored in memory and retrieved and transferred along the network at an appropriate interval. For example, if the bandwidth of the network permits the transfer of five cells per second and every fifth cell is reserved for the isochronous data cell, then the isochronous data cell may have to be stored in memory until the fifth cell is to be transferred along the network.

Continuing to refer to FIGS. 5 and 6, if the isochronous data transmit buffer 50 is not full, multiplexer controller 48 retrieves nonisochronous data from frame segmentation buffer 52 and segments the data to create a nonisochronous data cell (step 650). Once the cell is created, it may be transferred along the ATM based B-ISDN network (step 660). Alternatively, as with isochronous data cells, the nonisochronous data cells may have to be temporarily stored and retrieved as network bandwidth requirements dictate.

Referring again to FIG. 5, the demultiplexer portion 42 is constructed similar to the multiplexer portion and preferably includes a cell demultiplexer controller 54 which has a processor and associated memory for storing system and application programs, and buffer memories 56 and 58. Cell demultiplexer controller 54 preferably utilizes processor 60 and memory 62. However, one skilled in the art will recognize that independent processing circuitry may be utilized for each controller 48 and 54. Cell demultiplexer controller 54 also includes demultiplexing communication circuitry 66 coupled to the processor. The communication circuitry 66 extracts the payload and header information from the isochronous and nonisochronous ATM cells received from the ATM based B-ISDN network.

As noted, the header information includes the channel identifier. Communications received from the B-ISDN network are directed to the appropriate isochronous or non-isochronous data processors utilizing the channel identifier. Typically, upon creation of the logical connection, a cross-reference table relating to the channel identifier and associated processor is generated by the host processor establishing the virtual channel. The table is stored in memory 62 of the corresponding network interface 22. Once the destination of the isochronous or nonisochronous data is ascertained by the network interface, the data may be transferred to the appropriate processor 34 or 36 using, for example, standard communication backplanes. A suitable backplane configuration is a peripheral component interconnect (PCI) bus 44 and shared PCI bridge 46, shown in FIG. 5.

Figure 7:
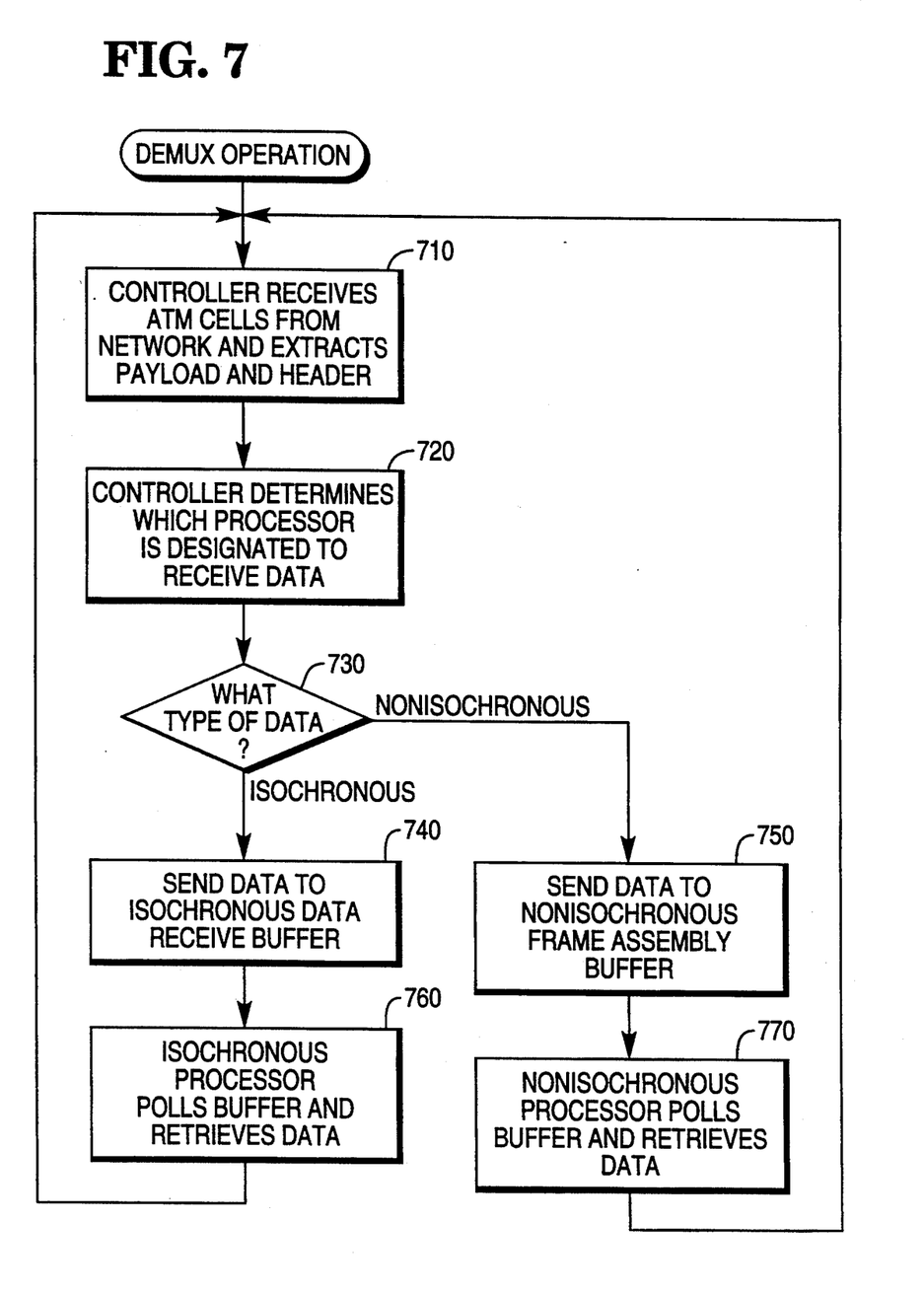
FIG. 7 is a flow diagram of the demultiplexing operating according to the present invention.

FIG. 7 illustrates an exemplary flow diagram for the demultiplexing operation according to the present invention. As noted above, before any communications between processors can occur, a logical connection must be created. Data is received from the ATM based B-ISDN network by the demultiplexer controller 54 which demultiplexes the incoming stream of ATM cells, by extracting payload and header information from each cell (step 710). The controller determines which processor 34 or 36 is designated to receive the data using the channel identifier. If the data is isochronous, the controller directs the data to the isochronous data receive buffer 56 (steps 730 and 740). If the data is nonisochronous, the controller directs the data to the frame reassembly buffer 58 (steps 730 and 750). Once the data is transferred to the appropriate buffer, the data is then transferred to the appropriate processor (step 760 or 770). Numerous methods may be implemented to transfer the data within the buffer to the appropriate processor. For example, the individual processors 34 and 36 may periodically poll the network interface 22 for buffer data designated for that particular processor. However, other known communication techniques may be utilized to transfer the data to the appropriate processor.

What has been described is merely illustrative of the application of the principles of the present invention. Other arrangements and methods can be implemented by those skilled in the art without departing from the spirit and scope of the present invention.

What is claimed is:

1. A network interface for multiplexing and demultiplexing isochronous and nonisochronous data streams in asynchronous transfer mode based communications networks, which comprises:
   a multiplexer portion including means for receiving isochronous and nonisochronous data from independent processors and for generating ATM cells incorporating said data, and means for multiplexing said ATM cells onto a single logical connection associated with said asynchronous transfer mode based communication network; and
   a demultiplexer portion including means for receiving isochronous and nonisochronous ATM cells from said single logical connection and for demultiplexing said isochronous and nonisochronous ATM cells to extract isochronous data from said isochronous ATM cells and nonisochronous data from said nonisochronous ATM cells, and means for storing said extracted isochronous and nonisochronous data for subsequent transfer to independent processors.

2. The network interface according to claim 1, wherein said multiplexer portion further comprises:
   first buffer means for storing isochronous data received from isochronous processors;
   second buffer means for storing nonisochronous data received from nonisochronous processors; and
   a multiplexing controller coupled to said first and second buffer means, said multiplexing controller including means for retrieving said isochronous data from said first buffer means and for creating an ATM cell incorporating said isochronous data, and means for retrieving said nonisochronous data from said second buffer means and for creating an ATM cell incorporating said nonisochronous data, and means for multiplexing said isochronous and nonisochronous ATM cells onto a single logical connection of an ATM based communication network.

3. The network interface according to claim 2, wherein said multiplexing controller comprises a microprocessor, memory and ATM cell multiplexing circuitry.

4. The network interface according to claim 1, wherein said demultiplexer portion further comprises:
   a demultiplexing controller coupled to said ATM based communication network, said demultiplexing controller including means for retrieving isochronous and nonisochronous ATM cells from said ATM based communication network and for demultiplexing said ATM cells and extracting said isochronous and nonisochronous data;
   first buffer means coupled to said demultiplexing controller for storing said received isochronous data; and
   second buffer means coupled to said demultiplexing controller for storing said received nonisochronous data.

5. The network interface according to claim 4, wherein said demultiplexing controller comprises a microprocessor, memory and ATM cell demultiplexing circuitry.

6. A communication asynchronous transfer mode network for multiplexing and demultiplexing isochronous and nonisochronous data streams over a single logical connection, which comprises:
   at least one first network interface coupled to transmitting processors, wherein said transmitting processors include isochronous and nonisochronous processors, and said first network interface receives isochronous and nonisochronous data from corresponding transmitting processors, generates individual ATM cells incorporating said isochronous data or said nonisochronous data, and multiplexes said ATM cells for subsequent transmission onto an ATM based broadband communication network; and
   at least one second network interface coupled to receiving processors, wherein said receiving processors include isochronous and nonisochronous processors, and said second network interface demultiplexes ATM cells received from said ATM based broadband communication network extracting said isochronous data and said nonisochronous data therefrom, and stores said extracted data for subsequent transfer to said receiving processors;

wherein said ATM based broadband communication network is connected between said at least one first network interface and said at least one second network interface.

7. The communication network according to claim 6, wherein said first and second network interfaces comprise:
- a multiplexing controller coupled to said ATM based broadband communication network and to transmit buffer memory means; and
- a demultiplexing controller coupled to said ATM based broadband communication network and to receive buffer memory means.

8. The communication network according to claim 7, wherein said multiplexing controller comprises a microprocessor, memory and ATM cell multiplexing circuitry.

9. The communication network according to claim 7, wherein said demultiplexing controller comprises a microprocessor, memory and ATM cell demultiplexing circuitry.

10. A method for transferring isochronous and nonisochronous data over an ATM based broadband communication network, comprising the steps of:
- establishing a single logical connection on said ATM based broadband communication network between a nonisochronous processor at a transmitting location and a nonisochronous processor at a receiving location;
- transferring nonisochronous data from said nonisochronous processor at the transmitting location and isochronous data from an isochronous processor located at the transmitting location to a first network interface located at the transmitting location;
- converting said nonisochronous data transferred to said first network interface and said isochronous data transferred to said first network interface into individual ATM cells; and
- multiplexing said ATM cells onto said single logical connection.

11. The method according to claim 10 further comprising the steps of:
- receiving ATM cells transmitted from said transmitting location at a second network interface located at said receiving location;
- demultiplexing said received ATM cells to extract said isochronous and nonisochronous data therefrom;
- storing said extracted isochronous and nonisochronous data in buffer memory; and
- transferring said extracted isochronous and nonisochronous data from said buffer memory to corresponding isochronous and nonisochronous processors.

* * * * *